(12) United States Patent
Sun et al.

(10) Patent No.: US 11,760,962 B1
(45) Date of Patent: Sep. 19, 2023

(54) ENVIRONMENTAL FRIENDLY DETERGENT TABLET, AND PREPARATION METHOD AND TABLETING EQUIPMENT THEREOF

(71) Applicant: Guangzhou Joyson Cleaning Products Co., Ltd., Guangdong (CN)

(72) Inventors: Jianfeng Sun, Guangzhou (CN); Fenglei Li, Guangzhou (CN); Min Sun, Guangzhou (CN); Haixiang Zeng, Guangzhou (CN)

(73) Assignee: Guangzhou Joyson Cleaning Products Co., Ltd., Guangdong (CN)

( * ) Notice: Subject to any disclaimer, the term of this patent is extended or adjusted under 35 U.S.C. 154(b) by 0 days.

(21) Appl. No.: 17/946,220

(22) Filed: Sep. 16, 2022

Related U.S. Application Data

(63) Continuation of application No. PCT/CN2022/104547, filed on Jul. 8, 2022.

(51) Int. Cl.
*C11D 17/00* (2006.01)
*C11D 1/37* (2006.01)
*C11D 3/20* (2006.01)
*C11D 3/33* (2006.01)
*C11D 11/00* (2006.01)
*C11D 3/37* (2006.01)
*C11D 3/22* (2006.01)
*C11D 3/386* (2006.01)
(Continued)

(52) U.S. Cl.
CPC ........ *C11D 17/0086* (2013.01); *B29C 43/003* (2013.01); *B29C 43/02* (2013.01);
(Continued)

(58) Field of Classification Search
CPC .......................... C11D 17/0086; C11D 1/146
See application file for complete search history.

(56) References Cited

U.S. PATENT DOCUMENTS 1,792,675 A * 2/1931 Chamberlain ........ B42C 9/0043
100/237
3,225,713 A * 12/1965 Kruse ................... B30B 15/302
425/449
(Continued)

FOREIGN PATENT DOCUMENTS

CN 1152334 A 6/1997
CN 106367222 A 2/2017
(Continued)

OTHER PUBLICATIONS

International Search Report to Corresponding Application No. PCT/CN2022/104547; dated Apr. 4, 2023, 4 Pgs.
(Continued)

*Primary Examiner* — Liam J Heincer
*Assistant Examiner* — M. Reza Asdjodi
(74) *Attorney, Agent, or Firm* — COOPER LEGAL GROUP, LLC

(57) ABSTRACT

The present application discloses an environmental friendly detergent tablet, and a preparation method and an tableting equipment thereof, belonging to the field of washing products. An environmental friendly detergent tablet is made of the following raw materials by weight percentage: polyvinyl alcohol, film-forming agent, surfactant, plant starch, co-solvent, bio-enzyme formulation, water softener, and other additives; the preparation method includes the following steps: mixing water, polyvinyl alcohol and film-forming agent under stirring, heating to 80° C.-90° C., and continuing stirring to obtain an initial mixed slurry; adding a co-solvent into the initial mixed slurry, then adding a surfactant, then adding a plant starch, under stirring, to obtain a mixed materials; drying the mixed materials, coating with the bio-enzyme formulation, molding, and slicing to obtain the environmental friendly detergent tablet.

3 Claims, 5 Drawing Sheets

(51) Int. Cl.
  *B29C 43/02* (2006.01)
  *B29C 43/40* (2006.01)
  *B29C 43/00* (2006.01)
  *C11D 1/14* (2006.01)
  *C11D 1/28* (2006.01)

(52) U.S. Cl.
  CPC ............... *B29C 43/40* (2013.01); *C11D 1/37* (2013.01); *C11D 3/2086* (2013.01); *C11D 3/222* (2013.01); *C11D 3/33* (2013.01); *C11D 3/3753* (2013.01); *C11D 3/38609* (2013.01); *C11D 3/38645* (2013.01); *C11D 11/0017* (2013.01); *C11D 11/0082* (2013.01); *B29K 2003/00* (2013.01); *C11D 1/146* (2013.01); *C11D 1/28* (2013.01)

(56) References Cited

U.S. PATENT DOCUMENTS

| | | | |
|---|---|---|---|
| 2005/0148488 A1* | 7/2005 | Jekel | C11D 3/2086 510/447 |
| 2005/0225003 A1* | 10/2005 | Holderbaum | C11D 17/0078 264/109 |
| 2006/0073263 A1* | 4/2006 | Binder | A23L 29/219 426/658 |
| 2011/0136719 A1 | 6/2011 | Jalbert et al. | |
| 2016/0053027 A1* | 2/2016 | Essers | C08L 3/02 127/71 |

FOREIGN PATENT DOCUMENTS

| | | | |
|---|---|---|---|
| CN | 106381236 | A | 2/2017 |
| CN | 206337243 | U | 7/2017 |
| CN | 107022425 | A | 8/2017 |
| CN | 111333738 | A * | 6/2020 |
| WO | 2022126232 | A1 | 6/2022 |

OTHER PUBLICATIONS

Canadian Intellectual Property Office; Office Action dated Feb. 8, 2023; 8 Pgs.

* cited by examiner

ENVIRONMENTAL FRIENDLY DETERGENT TABLET, AND PREPARATION METHOD AND TABLETING EQUIPMENT THEREOF

CROSS-REFERENCE TO RELATED APPLICATION

This application is a continuation of international PCT application serial no. PCT/CN2022/104547, filed on Jul. 8, 2022. The entirety of international PCT application serial no. PCT/CN2022/104547 is hereby incorporated by reference herein and made a part of this specification.

TECHNICAL FIELD

The present application relates to the technical field of washing products, and particularly to an environmental friendly detergent tablet, and preparation method and tableting equipment thereof.

BACKGROUND ART

Detergent is an indispensable household washing product in people's daily life. In recent years, great changes have taken place in the dosage form. The concentration of detergent is more and more favored by the industry and the consumers, such as concentrated liquid and concentrated laundry pods. In particular, in recent years, the solid sheet-shaped detergent tablet have gradually attracted the attention of domestic and foreign consumers due to its portability. Most of the detergent tablet are solid sheets prepared by using polyvinyl alcohol as film-forming agent, melting and mixing polyvinyl alcohol, water and surfactant, and then drying.

Due to the increasing environmental protection requirements in various countries to adapt sustainable development in the future, some foreign countries and regions require that the biodegradation rate of detergent products should reach 60% or more within 28 days. Because polyvinyl alcohol has lower degradability and longer biodegradation time, and usually begins to decompose slowly after one year, adding too much polyvinyl alcohol into the detergent tablet will impair the biodegradability of the product itself, such that the product would not meet the requirements of biodegradation within 28 days.

However, when the amount of polyvinyl alcohol added is too small, there will exist problem that the detergent tablet cannot be formed as tablet and are unstable. For example, the detergent tablets are easy to break in winter and are easy to stick together in summer, resulting in product quality problems.

SUMMARY

In order to shorten the degradation period of the detergent tablet, and meanwhile ensure the quality of the detergent tablet, the present application provides an environmental friendly detergent tablet, and a preparation method and a tableting equipment thereof.

In a first aspect, the present application provides an environmental friendly detergent tablet, which adopts the following technical solution:

an environmental friendly detergent tablet including the following raw materials by weight percentage:
polyvinyl alcohol 4%-17%;
film-forming agent 1%-5%;
surfactant 20%-50%;
plant starch 20%-50%;
cosolvent 1%-12%;
enzyme 0.1%-1%;
water softener 1%-7%; and
other additives 0-1%;
the polyvinyl alcohol has an average polymerization degree of 1700-2700 and an average molecular weight of 84000-130000.

In some embodiments, the polyvinyl alcohol has an average polymerization degree of 2300-2500 and an average molecular weight of 111000-124000.

In the above technical solution, high molecular weight polyvinyl alcohol and plant starch are used to cooperate with each other, so as to obtain an detergent tablet with good stability, good biodegradability and high detergency.

Taking advantage of the high molecular weight characteristics of polyvinyl alcohol, the viscosity of the detergent tablet is increased, which helps the degradable surfactant be stably exist in the detergent tablet. Moreover, the exist of high molecular weight polyvinyl alcohol obviously improves the compatibility of the plant starch in the detergent tablet system, so more plant starch can be added to the detergent tablet system. Further, the plant starch can rub the stains on the clothes, and help peel off the stains, thereby assisting washing. Therefore, the addition of plant starch can not only improve the washing ability of the detergent tablet, but also replace part of polyvinyl alcohol, thereby reducing the amount of polyvinyl alcohol. In addition, the plant starch itself is easy to degrade, so the biodegradability of the detergent tablet is greatly improved.

In the present application, the bio-enzyme formulation is added by normal temperature process, so that the activity of the bio-enzyme formulation is not affected by the high temperature, and the decontamination effect is maximized. The bio-enzyme formulation can make the protein and other high molecular compounds in the dirt of the fabric decompose into small molecular substances such as soluble amino acids to improve the decontamination ability.

In addition, the addition of plant starch can reduce the moisture content of the detergent tablet after drying. The bio-enzyme formulation contains solvent, and the plant starch can reduce the impact of moisture caused by the addition of bio-enzyme formulation after the drying of the detergent tablet. Therefore, the detergent tablet can be packed in plastic free cartons, which is more accord with the concept of low-carbon environmental protection.

In some embodiments, a weight ratio of the polyvinyl alcohol to the plant starch is 1:(1.5-3).

In the above technical solution, the polyvinyl alcohol and the plant starch are mixed according to the above ratio range, and a good improvement effect is obtained in terms of degradation rate and detergency.

In some embodiments, the plant starch has a whiteness value of 84-93% and a moisture content of 7-15%, in which the moisture content is calculated by weight.

In the above technical solution, the plant starch with whiteness value in the above range has good detergency, and the plant starch with moisture content in the above range is not easy to impair the stability of the detergent tablet, so that the detergent tablet has better comprehensive performance.

In some embodiments, the plant starch is one or more selected from a group consisting of mung bean starch, potato starch, sweet potato starch, corn starch, tapioca starch and pea starch.

In some embodiments, the plant starch is selected from a group consisting of pea starch, potato starch and corn starch; a weight percentage of the pea starch in the raw materials is 10%-20%, a weight percentage of the corn starch in the raw materials is 10%-20%, and a weight percentage of the potato starch in the raw materials is 0-10%.

In some embodiments, the plant starch is selected from pea starch and corn starch, a weight percentage of the pea starch in the raw materials is 10%-20%, and a weight percentage of the corn starch in the raw materials is 10%-20%.

In the above technical solution, pea starch, corn starch and potato starch have high biodegradability. Moreover, the combination of different starches can help to improve the detergency of the detergent tablet and replace more polyvinyl alcohol, so as to improve the biodegradability of the detergent tablet.

In some embodiments, the pea starch has a whiteness value of 89%-92.5% and a moisture content of 7%-9.3%; the potato starch has a whiteness value of 89.5%-93% and a moisture content of 11.5%-15%; and the corn starch has a whiteness value of 86%-90% and a moisture content of 9%-10.5%.

In the above technical solution, pea starch, corn starch and potato starch have respective whiteness values and moisture contents, and the their costs are different. By considering the whiteness values and moisture contents of different types of starches, and balancing the effects of whiteness values and moisture contents on the detergent tablet, the detergency of the detergent tablet is ensured. In addition, the stability of detergent tablet having different types of starch mixed is improved by combining the composition and performance differences among different types of plant starches.

In some embodiments, the film-forming agent is maltodextrin, and a DE value of the maltodextrin is 10%-20%.

In the above technical solution, maltodextrin is derived from plants and has good biodegradability. Maltodextrin has strong viscosity after being dissolved, and may further replace part of polyvinyl alcohol taking advantage of its viscosity, which is conducive to accelerating the biodegradation of detergent tablet.

In some embodiments, the surfactant is one or more selected from a group consisting of sodium alkenyl sulfonate, coco-sulfate, fatty acid methyl ester sulfonate, fatty acid methyl ester ethoxy sulfonate, laureth polyether sulfate, alkyl polyglycoside, fatty alcohol polyoxyethylene ether, isomeric alcohol polyoxyethylene ether, modified oil ethoxylate, rhamnolipid, sophorolipid and sorbitan fatty acid ester.

In the above technical solution, the surfactant not only has high washing ability, but also has good biodegradability, which helps to obtain detergent tablet with good biodegradability and high detergency.

In some embodiments, the surfactant includes one or more selected from a group consisting of coco-sulfate and fatty acid methyl ester ethoxy sulfonate in a weight ratio of (3-4):1, modified oil ethoxylate and fatty alcohol polyoxyethylene ether in a weight ratio of (1.5-2.5):1, rhamnolipid and sophorolipid in a weight ratio of (1-2):1, and alkyl polyglycoside.

In the above technical solution, the combination of coco-sulfate and fatty acid methyl ester ethoxy sulfonate is conducive to improving the emulsifying ability of anionic surfactant in the detergent tablet system, thereby improving the washing ability of the detergent tablet.

Moreover, the combination of the two is conducive to improving the biodegradability of coco-sulfate and the biodegradability of the detergent tablet system.

Modified oil ethoxylate is selected from modified coconut oil ethoxylate (SOE-C), modified palm oil ethoxylate (SOE-P), modified palm kernel oil ethoxylate (SOE-N), preferably, modified coconut oil ethoxylate (SOE-C). The combination of modified oil ethoxylate and fatty alcohol polyoxyethylene ether not only has high biodegradation rate, but also reduces the cloud point of fatty alcohol polyoxyethylene ether. The wettability and permeability of the raw material components in the detergent tablet system are improved, and at the same time, the washing performance of the detergent tablet in cold water is improved, which is conducive to better wetting and dissolution of the detergent tablet in water, and is conducive to improving the washing ability. In addition, the combination of modified oil ethoxylate and fatty alcohol polyoxyethylene ether is conducive to dispersing a large amount of plant starch during washing, better assisting washing, and achieving the effect of no residue of detergent tablet in the fast washing mode.

The combination of rhamnolipid and sophorolipid not only has the detergency of surfactant, but also helps to accelerate the decomposition rate of polyvinyl alcohol molecules and improve the biodegradation rate.

Alkyl polyglycoside has low surface tension, no cloud point, strong wetting ability, strong detergency, rich and delicate foam, strong compatibility, no irritation to skin, rapid and complete biodegradation, and is non-toxic and harmless, so it can be combination with various types of surfactants.

In some embodiments, the co-solvent is one or more selected from a group consisting of glycerol, propylene glycol, sorbitol and butanediol.

In the above technical solution, the co-solvent can dissolve a plurality of organic and inorganic substances, has a certain dissolving effect on common stains, and can cooperate with surfactants to quickly remove stains.

In some embodiments, the co-solvent includes glycerol and propylene glycol in a weight ratio of (1-2):1.

In the above technical solution, the above combination is helpful to improve the biodegradation rate of the co-solvent.

In some embodiments, the bio-enzyme formulation is one or more selected from a group consisting of protease, cellulase, amylase, pectinase, mannanase and lipase.

In the above technical solution, the above-mentioned bio-enzyme formulation has strong decomposition ability and has good washing effect on stains such as bloodstains, sweat stains, milk stains, grease and starch that are difficult to clean in daily life.

In some embodiments, the water softener is one or more selected from a group consisting of tetrasodium glutamate acid diacetate, sodium citrate, citric acid, sodium iminodisuccinate, polyaspartic acid and sodium polyepoxysuccinate.

In the above technical solution, the water softener can chelate the divalent metal ions in tap-water, such as calcium ions and magnesium ions, and has good effect on assisting the detergency of the detergent.

In some embodiments, the environmental friendly detergent tablet is made of the following raw materials by weight percentage: 4%-17% of polyvinyl alcohol, 1-5% of dextrin, 10%-20% of pea starch, 10%-20% of corn starch, 0.05%-0.5% of protease, 0.05%-0.5% of cellulase, 0-0.3% of amylase, 0-0.3% of pectinase, 0.5%-3% of sodium citrate, 0.1-2% of citric acid, 0-2% of tetrasodium glutamate acid diacetate, 3.2%-6% of glycerol, 3.2%-6% of propylene glycol, 0-1% of butanediol, 24.5-36% of sodium coco-sulfate, 0-3.6% of modified oil ethoxylate, 1.5%-3.6% of fatty alcohol polyoxyethylene ether, 4.5%-8.1% of fatty acid methyl ester ethoxy sulfonate, 1.5-2% of alkyl polyglycoside, 1.1%-2.2% of sophorolipid and 2.2%-3.4% of rhamnolipid.

In some embodiments, the raw materials of the environmental friendly detergent tablet also include plant essence.

Plant essence is one or more selected from a group consisting of jasmine essence, lemon essence, citrus essence, lavender essence and grapefruit essence.

In the above technical solution, plant essence is added to make the washed fabric have a fresh and pleasant feeling.

In a second aspect, the present application provides a preparation method for an environmental friendly detergent tablet, which adopts the following technical solution:

a preparation method for an environmental friendly detergent tablet including the following steps:

mixing water, polyvinyl alcohol and a film-forming agent under stirring, heating to 80° C-90° C., and continuing stirring to obtain an initial mixed slurry;

adding a co-solvent into the initial mixed slurry under stirring, then adding a surfactant under stirring, then adding a plant starch under stirring, to obtain a mixed materials;

drying the mixed materials, coating with the bio-enzyme formulation, molding, and slicing to obtain the environmental friendly detergent tablet.

In the above technical solution, a stable initial mixed slurry is formed first, so that the system of detergent tablet is initially formed, then the co-solvent and surfactant are added, and finally the plant starch is added, to avoid a gelatinization of the plant starch due to long reaction time under high temperature environment, resulting in instability of the mixed materials.

The bio-enzyme formulation is attached to the surface of the detergent tablet by coating. The amount of the bio-enzyme formulation is small, which further reduces the impact on the detergent tablet without plastic packaging, and also improves the detergency of the detergent tablet.

In a third aspect, the present application provides a tableting equipment for the environmental friendly detergent tablet, which adopts the following technical solution:

a tableting equipment for the environmental friendly detergent tablet including a frame, the frame is provided with a molding device configured for drying the mixed materials into a solid semi-finished product, a coating device configured for coating with the bio-enzyme formulation, an advancing device configured for moving the solid semi-finished product forward, an adjusting device configured for controlling the conveying state of the solid semi-finished product, and a slicing device configured for cutting the solid semi-finished product to obtain a finished product; the slicing device includes a transverse cutting mechanism, a vertical cutting mechanism, a feeding conveyor belt rotationally installed on the frame and configured to support the solid semi-finished product, and a downward pressing and feeding mechanism configured for pressing the solid semi-finished product and moving the solid semi-finished product.

In the above technical solution, the mixed materials is formed into solid semi-finished product under the action of the molding device, the advancing device and the adjusting device;

then the solid semi-finished product are cut into finished products by the slicing device. The solid semi-finished product are conveyed forward under the pressing action of the feeding conveyor belt and the downward pressing and feeding mechanism. The adjusting device controls the change of the conveying state to realize the intermittent advance of the solid semi-finished product, so that the transverse cutting of the solid semi-finished product is not disturbed by the conveying state of the solid semi-finished product, and the quality of the detergent tablet is ensured and the efficiency is improved.

In some embodiments, the adjusting device includes a first guide roller and a second guide roller rotatably installed on the frame, an adjusting rod rotatably installed on the frame, and an adjusting roller rotatably installed on the adjusting rod. The solid semi-finished product is wound around the first guide roller, the adjusting roller, and the second guide roller in sequence in the conveying direction; the frame is provided with an angle sensor configured for obtaining a rotation angle of the adjusting rod, and the angle sensor is connected in communication with a controller for controlling the operation of the downward pressing and feeding mechanism.

In the above technical solution, with the continuous advancing of the solid semi-finished product passing through the advancing device, there are more solid semi-finished product in the adjusting device; the tension force applied by the solid semi-finished product to the adjusting roller is reduced, and the adjusting roller swings downward under its gravity; at the same time, the adjusting rod is rotated; when the adjusting rod is rotated to a predetermined angle, the angle sensor is triggered and the downward pressing and feeding mechanism is controlled by the controller to operate; the downward pressing and feeding mechanism drives the solid semi-finished product to move forward. At this time, there are fewer solid semi-finished product in the regulating device, the tension force applied by the solid semi-finished product to the adjusting roller is increased, and the adjusting roller is tensioned and swings upward. At the same time, the regulating rod is rotated to a predetermined angle, and the angle sensor is again triggered to stop the operation of the downward pressing and feeding mechanism, so as to realize the intermittent advance of the solid semi-finished product.

In some embodiments, the frame is provided with an embossing roller, and the embossing roller and the first guide roller jointly extrude the solid semi-finished product.

In some embodiments, the downward pressing and feeding mechanism includes a pressing plate, a lifting assembly for driving the pressing plate to be close to or away from the solid semi-finished product, and a translation assembly for driving the pressing plate to move forward or backward in the conveying direction of the solid semi-finished product. The controller is configured to control the operation of the lifting assembly and the translation assembly.

In the above technical solution, the rise and fall of the pressing plate can realize the pressing state of the solid semi-finished product. Under the pressing state, the horizontal movement of the pressing plate can realize the advancing of the solid semi-finished product.

In some embodiments, the lifting assembly includes a lifting cylinder connected to the frame, and an output end of the lifting cylinder is connected to the pressing plate.

In some embodiments, the translation assembly includes a mounting plate configured to be connected to the pressing plate, a rack connected to the mounting plate, a moving motor installed on the rack, and a gear provided on an output shaft of the moving motor; the gear meshes with the rack.

In some embodiments, the translation assembly includes a mounting plate configured to be connected to the pressing plate, and a moving cylinder installed on the frame; and an output end of the moving cylinder is connected to the mounting plate.

In some embodiments, the molding device includes a trough configured for containing the mixed materials, a drying-forming roller rotatably installed on the frame and provided above the trough, and a forming driver for driving the drying-forming roller to rotate; the mixed materials is attached to the drying-forming roller and forms a solid semi-finished product.

In the above technical solution, the mixed materials is attached to the drying-forming roller, and the heat of the drying-forming roller volatilizes the moisture of the mixed materials and dries it into solid semi-finished product.

In some embodiments, the advancing device includes an advancing roller rotatably installed on the frame and an advancing driver for driving the advancing roller to rotate; the solid semi-finished product is wound around the advancing roller after leaving the drying-forming roller.

In the above technical solution, the advancing roller rotates to drive the solid semi-finished product to move forward, leave the drying-forming roller and go to the next device.

In some embodiments, the vertical cutting mechanism includes a fixed base installed on the frame and vertical cutting blades connected to the fixed base; and the vertical cutting blades are arranged at intervals in a direction perpendicular to the conveying direction of the solid semi-finished product.

In some embodiments, the transverse cutting mechanism includes a cutting saw and a moving component configured for driving the cutting saw to move in a direction perpendicular to the conveying direction of the solid semi-finished product.

In some embodiments, the tableting equipment is also provided with an discharging device, and the discharging device is arranged at a delivery side of the slicing device. The discharging device includes a discharging conveyor belt for receiving and conveying the finished products out, an detection photoelectric switch configured for sensing the position of the finished products, a visual detector configured for detecting products, and a sorting mechanism configured for sorting good and bad products; the detection photoelectric switch is connected in communication with the visual detector; and the visual detector is connected in communication with a controller configured for controlling the sorting mechanism.

In some embodiments, the sorting mechanism includes a sorting plate, a sorting motor configured for driving the rotation of the sorting plate, a sorting cylinder installed on the sorting plate, a sorting sucker connected to the sorting cylinder, and a good product conveyor belt arranged at an end of the discharging conveyor belt. The sorting motor, the sorting cylinder, and the sorting sucker are connected in communication with the visual detector.

In the above technical solution, the discharging device can transport the finished products to the next process, visually inspect the finished products, sort out the good and bad products according to the appearance of the finished products, and make the good products flow into the next process.

In some embodiments, a transfer mechanism is provided between the slicing device and the discharging device, and the transfer mechanism includes a transfer plate moving between the slicing device and the discharging device, a first transfer cylinder arranged on the frame, a transfer base arranged on an output end of the first transfer cylinder, and a second transfer cylinder arranged on the transfer base; an output end of the second transfer cylinder is connected to the transfer plate; the output directions of the first transfer cylinder and the second transfer cylinder are perpendicular to each other; and the transfer plate is provided with a transfer sucker.

In the above technical solution, the transfer sucker sucks up the finished products, and the first transfer cylinder and the second transfer cylinder drive the finished products to leave the slicing device and enter the discharging device, so as to realize the transfer of the finished products.

To sum up, the present application has the following beneficial effects:

1. In the present application, high molecular weight polyvinyl alcohol and plant starch are combined to obtain a detergent tablet with good biodegradability and high detergency; taking advantage of the high molecular weight characteristics of polyvinyl alcohol, the viscosity of the detergent tablet is increased, which helps the degradable surfactant be stably exist in the detergent tablet. Moreover, the exist of high molecular weight polyvinyl alcohol obviously improves the compatibility of the plant starch in the detergent tablet system, so more plant starch with assisting washing function can be added to the detergent tablet system. Therefore, the plant starch can not only improve the detergency of the detergent tablet, but also replace part of polyvinyl alcohol, thereby reducing the amount of polyvinyl alcohol. In addition, the plant starch itself is easy to degrade, so the biodegradability of the detergent tablet is greatly improved.

2. In the present application, plant starch with specific whiteness value and moisture content is used, and different kinds of plant starch are combined, so that the detergent tablet with not only good detergency, but also good stability is obtained.

DETAILED DESCRIPTION

Figure 1:
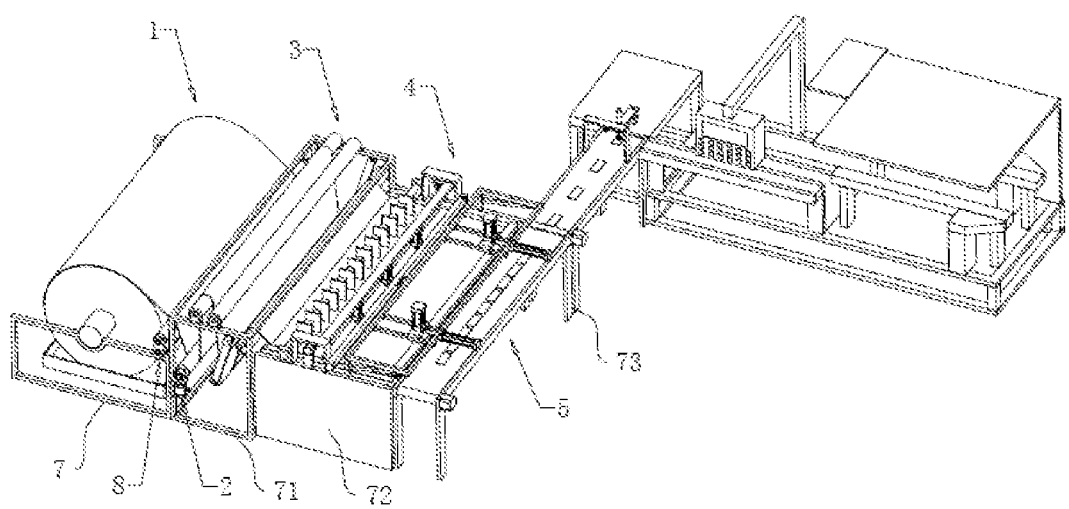
FIG. 1 is a tri-dimensional structural diagram according to Example 1 of the present application.

The present application is further described in detail below in combination with the Examples.

EXAMPLES

Example 1

An environmental friendly detergent tablet included the following raw materials by weight percentage: polyvinyl alcohol 4 kg; film-forming agent 3 kg; surfactant 41.5 kg; plant starch 38 kg; co-solvent 12 kg; bio-enzyme formulation 0.5 kg; and water softener 1 kg.

Specifically, the film-forming agent was maltodextrin; the surfactant was sodium coco-sulfate; the plant starch was pea starch; the co-solvent was glycerol and propylene glycol, in particular, glycerol 6 kg and propylene glycol 6 kg; the bio-enzyme formulation was protease and cellulase, in particular, protease 0.25 kg and cellulase 0.25 kg; and the water softener was tetrasodium glutamate acid diacetate, sodium citrate and citric acid, in particular, tetrasodium glutamate acid diacetate 0.4 kg, sodium citrate 0.5 kg, citric acid 0.1 kg.

The polyvinyl alcohol had an average polymerization degree of 1700 and an average molecular weight of 84000.

A DE value of the maltodextrin was 10%.

The pea starch had a whiteness value of 89%, and a moisture content of pea starch of 7%.

The protease had an enzyme activity content of 100 PRMU-U/g; the cellulase had an enzyme activity content of 5000 ECU/g; and the protease and cellulase had a water content of 50%.

A preparation method for the environmental friendly detergent tablet includes the following steps:
  adding 50 kg water, polyvinyl alcohol and a film-forming agent into a stirring tank, mixing for 5 min under stirring, then heating to 80° C., and continuing stirring for 30 min to obtain an initial mixed slurry;
  adding a co-solvent into the initial mixed slurry under stirring for 10 min, then adding a surfactant under stirring for 10 min, then adding a plant starch under stirring for 10 min to obtain the mixed materials;
  drying the mixed materials in a tableting equipment, coating with the bio-enzyme formulation, molding, and slicing to obtain the environmental friendly detergent tablet.

Example 2

An environmental friendly detergent tablet included the following raw materials by weight percentage:
  polyvinyl alcohol 10 kg; film-forming agent 5 kg; surfactant 43 kg; plant starch 30 kg; co-solvent 6.4 kg; bio-enzyme formulation 0.6 kg; water softener 5 kg.

Specifically, the film-forming agent was maltodextrin; the surfactant was sodium coco-sulfate; fatty acid methyl ester ethoxy sodium sulfonate and alkyl polyglycoside, in particular, sodium coco-sulfate 36 kg, fatty acid methyl ester ethoxy sodium sulfonate 5 kg and alkyl polyglycoside 2 kg; the plant starch was corn starch; the co-solvent was glycerol and propylene glycol, in particular, glycerol 4.3 kg and propylene glycol 2.1 kg; the bio-enzyme formulation was amylase and pectinase, in particular, amylase 0.3 kg and pectinase 0.3 kg; and the water softener was sodium citrate and citric acid, in particular, sodium citrate 3 kg, citric acid 2 kg.

The polyvinyl alcohol had an average polymerization degree of 2700 and an average molecular weight of 130000.

A DE value of the maltodextrin was 20%.

The amylase had an enzyme activity content of 140000 u/mL, the pectinase had an enzyme activity content of 100 PTF/mg, and the pectinase had a water content of 50%.

The fatty acid methyl ester ethoxy sodium sulfonate had a carbon number of 16-18.

The alkyl glycoside had a carbon number of 8-14.

The corn starch had a whiteness value of 86%, and a moisture content of 9%.

a preparation method for the environmental friendly detergent tablet included the following steps:
  adding 125 kg water, polyvinyl alcohol and a film-forming agent into a stirring tank, stirring for 2 min, then heating to 90° C., and continuing stirring for 20 min to obtain an initial mixed slurry;
  adding a co-solvent into the initial mixed slurry under stirring for 5 min, then adding a surfactant under stirring for 5 min, then adding a plant starch under stirring for 5 min to obtain the mixed materials;
  drying the mixed materials in a tableting equipment, coating with the bio-enzyme formulation, molding, and slicing to obtain the environmental friendly detergent tablet.

Example 3

The difference between this Example and Example 2 was that the composition and proportion of raw materials was different.

an environmental friendly detergent tablet included the following raw materials by weight percentage:
  polyvinyl alcohol 17 kg; film-forming agent 4 kg; surfactant 50 kg; plant starch 20 kg; co-solvent 1 kg; bio-enzyme formulation 1 kg; water softener 7 kg.

Specifically, the film-forming agent was maltodextrin; the surfactant was sodium coco-sulfate, fatty alcohol polyoxyethylene ether and alkyl polyglycoside, in particular, sodium coco-sulfate 44 kg, fatty alcohol polyoxyethylene ether 4 kg and alkyl polyglycoside 2 kg; the plant starch was potato starch; the co-solvent was butanediol; the bio-enzyme formulation was protease and cellulase, in particular, protease 0.5 kg and cellulase 0.5 kg; and the water softener was tetrasodium glutamate acid diacetate, sodium citrate and citric acid, in particular, tetrasodium glutamate acid diacetate 2 kg, sodium citrate 3 kg, citric acid 2 kg.

The polyvinyl alcohol had an average polymerization degree of 2300 and an average molecular weight of 111000.

A DE value of the maltodextrin was 20%.

The protease had an enzyme activity content of 100 PRMU-U/g; the cellulase had an enzyme activity content of 5000 ECU/g; and the protease and cellulase had a water content of 50%.

The fatty alcohol polyoxyethylene ether had an EO value of 9.

The alkyl glycosides had a carbon number of 8-14.

The potato starch had a whiteness value of 89.5%, and a moisture content of 11.5%.

In the preparation method for the environmental friendly detergent tablet, 212 kg of water was added to the stirring tank.

Example 4

The difference between this Example and Example 2 was that the composition and proportion of raw materials were different.

An environmental friendly detergent tablet included the following raw materials by weight percentage:
  polyvinyl alcohol 14 kg; film-forming agent 1 kg; surfactant 20 kg; plant starch 50 kg; co-solvent 8.9 kg; bio-enzyme formulation 0.1 kg; water softener 6 kg.

Specifically, the film-forming agent was maltodextrin; the surfactant was sodium coco-sulfate, rhamnolipid, sophorolipid and alkyl polyglycoside, in particular, sodium coco-sulfate 10 kg, rhamnolipid 4 kg, sophorolipid 4 kg and alkyl polyglycoside 2 kg; the plant starch was pea starch, corn starch and potato starch, in particular, pea starch 20 kg, corn starch 20 kg and potato starch 10 kg; the co-solvent was butanediol; the bio-enzyme formulation was protease and cellulase, in particular, protease 0.05 kg and cellulase 0.05 kg; and the water softener was tetrasodium glutamate acid diacetate, sodium citrate and citric acid, in particular, tetrasodium glutamate acid diacetate 1 kg, sodium citrate 3 kg, and citric acid 2 kg.

The polyvinyl alcohol had an average polymerization degree of 2300 and an average molecular weight of 111000.

A DE value of the maltodextrin was 20%.

The protease had an enzyme activity content of 100 PRMU-U/g; the cellulase had an enzyme activity content of 5000 ECU/g; and the protease and cellulase had a water content of 50%.

The alkyl glycoside had a carbon number of 8-14.

The pea starch had an whiteness value of 89% and a moisture content of 7%; the corn starch had a whiteness value of 86% and a moisture content of 9%; and the potato starch had a whiteness value of 93% and a moisture content of 15%.

In the preparation method for the environmental friendly detergent tablet, 140kg of water was added to the stirring tank.

Example 5

The difference between this Example and Example 2 was that the composition and proportion of raw materials were different.

An environmental friendly detergent tablet included the following raw materials by weight percentage:
polyvinyl alcohol 10 kg; film-forming agent 5 kg; surfactant 33 kg; plant starch 40 kg; co-solvent 6.4 kg; bio-enzyme formulation 0.6 kg; water softener 5 kg.

Specifically, the film-forming agent was maltodextrin; the surfactant was sodium coco-sulfate, fatty acid methyl ester ethoxy sodium sulfonate and alkyl polyglycoside, in particular, sodium coco-sulfate 27.5 kg, fatty acid methyl ester ethoxy sodium sulfonate 4 kg and alkyl polyglycoside 1.5 kg; the plant starch was pea starch and corn starch, in particular, pea starch 20 kg and corn starch 20 kg; the co-solvent was glycerol and propylene glycol, in particular, glycerol 3.2 kg and propylene glycol 3.2 kg; the bio-enzyme formulation was protease and cellulase, in particular, protease 0.3 kg and cellulase 0.3 kg; and the water softener was sodium citrate and citric acid, in particular, sodium citrate 3 kg, citric acid 2 kg.

The polyvinyl alcohol had an average polymerization degree of 2500 and an average molecular weight of 124000.

A DE value of the maltodextrin was 20%.

The protease had an enzyme activity content of 100 PRMU-U/g; the cellulase had an enzyme activity content of 5000 ECU/g; and the protease and cellulase had a water content of 50%.

The fatty acid methyl ester ethoxy sodium sulfonate had a carbon number of 16-18.

The alkyl glycoside had a carbon number of 8-14.

The pea starch had a whiteness value of 89% and a moisture content of 7%; and the corn starch had a whiteness value of 86% and a moisture content of 9%.

Example 6 to 7

The difference between Examples 6 to 7 and Example 5 was that the proportions of polyvinyl alcohol, surfactant, plant starch and sodium coco-sulfate are different, as shown in Table 1.

TABLE 1

| | Surfactant (kg) | | | | Plant starch (kg) | |
|---|---|---|---|---|---|---|
| | Polyvinyl alcohol (kg) | Sodium coco-sulfate | Fatty acid methyl ester sodium ethoxy sulfonate | Alkyl polyglycoside | Pea starch | Corn starch |
| Example 5 | 10 | 27.5 | 4 | 1.5 | 20 | 20 |
| Example 6 | 10 | 36 | 5 | 2 | 20 | 10 |
| Example 7 | 14 | 41 | 5 | 2 | 10 | 11 |

Example 8 to 14

The difference between Examples 8 to 14 and Example 6 was that the types of plant starch were different, as shown in Table 2.

TABLE 2

| | Starch types | Starch dosage (kg) | Whiteness value (%) | Moisture content (%) |
|---|---|---|---|---|
| Example 6 | Pea starch | 20 | 89 | 7 |
| | Corn starch | 10 | 86 | 9 |
| Example 8 | Potato starch | 30 | 93 | 15 |
| Example 9 | Sweet potato starch | 30 | 84 | 11.4 |
| Example 10 | Pea starch | 30 | 89 | 7 |
| Example 11 | Corn starch | 30 | 86 | 9 |
| Example 12 | Sweet potato starch | 20 | 84 | 11.4 |
| | Corn starch | 10 | 86 | 9 |
| Example 13 | Pea starch | 20 | 89 | 7 |
| | Potato starch | 10 | 93 | 15 |
| Example 14 | Pea starch | 20 | 92.5 | 9.3 |
| | Corn starch | 10 | 90 | 10.5 |

Examples 15 to 18

The differences between Examples 15 to 18 and Example 6 was that the composition and proportion of surfactants were different, as shown in Table 3.

TABLE 3

| | Surfactant (kg) | | | | | | |
|---|---|---|---|---|---|---|---|
| | Sodium coco-sulfate | Fatty acid methyl ester ethoxy sodium sulfonate | Modified oil ethoxylate | Fatty alcohol polyoxyethylene ether | Rhamnolipid | Sophorolipid | Alkyl polyglycoside |
| Example 6 | 36 | 5 | 0 | 0 | 0 | 0 | 2 |
| Example 15 | 34 | 5 | 0 | 0 | 1 | 1 | 2 |
| Example 16 | 24.5 | 4.5 | 3.6 | 3.6 | 3.4 | 1.4 | 2 |
| Example 17 | 24.5 | 6.1 | 3.6 | 2.4 | 2.2 | 2.2 | 2 |
| Example 18 | 24.5 | 8.1 | 3.6 | 1.5 | 2.2 | 1.1 | 2 |

The fatty acid methyl ester ethoxy sodium sulfonate had a carbon number of 16-18.

The fatty alcohol polyoxyethylene ether had an EO value of 9.

The modified oil ethoxylate was SOE-C-60;

The alkyl glycoside had a carbon number of 8-14.

Examples 19

This Example was different from Example 17 in that the raw material also contains other additives.

Specifically, an environmental friendly detergent tablet included the following raw materials by weight percentage:
polyvinyl alcohol 10 kg; film-forming agent 5 kg; surfactant 43 kg; plant starch 30 kg; co-solvent 6.4 kg; bio-enzyme formulation 0.6 kg; water softener 5 kg; and other additives 1 kg.

Specifically, other additives were lemon essence. In the preparation method, lemon essence and plant starch were added at the same time.

Examples 20

This Example was different from Example 19 in that the addition amount of other additives was 0.1 kg.

Comparative Example 1

This Comparative example was different from Example 5 in that the plant starch was replaced by same amount of polyvinyl alcohol. That is, the amount of polyvinyl alcohol was 40 kg, and the amount of plant starch was 0.

Comparative Example 2

This Comparative example was different from Example 5 in that part of the plant starch was replaced by same amount of polyvinyl alcohol. Specifically, the amount of polyvinyl alcohol was 2 kg, and the amount of plant starch was 38 kg.

Comparative Example 3

This Comparative example was different from Example 5 in that the polyvinyl alcohol had an average polymerization degree of 1200 and an average molecular weight of 64000.

Comparative Example 4

This Comparative example was different from Example 5 in that the polyvinyl alcohol had an average polymerization degree of 3000 and an average molecular weight of 146000.

Comparative Example 5

This Comparative example was different from Example 5 in that the film-forming agent was replaced by same amount of polyvinyl alcohol. That is, the amount of polyvinyl alcohol was 15 kg, and the amount of film-forming agent was 0.

Performance Test

The detergent tablet of each Example and Comparative example of the present application were tested according to the following test methods and standards.

The whiteness value was determined by "Starch-Determination of whiteness" (GB/T 22427.6-2008).

Biodegradation test was performed according to OECD 301B, then the 28 day degradation rate of the detergent tablet was obtained.

Forming stability: the detergent tablet was placed in a test environment with a temperature of (25±2)° C. and a humidity of (40±5)% for 48 h, then the detergent tablet was bended by hand to align and overlap the two sides, and whether the detergent tablet breaks was observed.

Moisture resistance stability: two detergent tablet were stacked together and were put in a test environment with temperature of (25±2)° C. and humidity of (85±5)% for 24 h. Then two detergent tablet were separated and observed whether there was adhesion between the detergent tablets. The adhesion phenomenon was divided into no adhesion, slight adhesion and obvious adhesion.

Moisture resistance stability: two detergent tablet were stacked together and were put in a test environment with temperature of (25±2)° C. and humidity of (85±5)% for 48 h. Then two detergent tablet were separated and observed whether there was adhesion between the detergent tablets. The adhesion phenomenon was divided into no adhesion, slight adhesion and obvious adhesion.

Detergency test: the test was performed according to GB/T 13174-2021 "determination of detergency and cyclic of washing property for laundry detergents"; the test pieces were JB-01 dirty cloth, JB-02 dirty cloth and JB-03 dirty cloth, and the decontamination ratio Pi of the detergent tablet was obtained. When Pi≥1.0, it was qualified, and <1.0, it was unqualified.

TABLE 4

|  | Degradation rate | Forming stability | 24h moisture resistance stability | 48h moisture resistance stability |
| --- | --- | --- | --- | --- |
| Example 1 | 64.2 | Unbroken | Slight adhesion | Obvious adhesion |
| Example 2 | 63.3 | Unbroken | Slight adhesion | Slight adhesion |
| Example 3 | 60.5 | Unbroken | No adhesion | Slight adhesion |
| Example 4 | 62 | Unbroken | No adhesion | Slight adhesion |
| Example 5 | 63.5 | Unbroken | Slight adhesion | Slight adhesion |
| Example 6 | 63.2 | Unbroken | No adhesion | No adhesion |
| Example 7 | 61.5 | Unbroken | No adhesion | No adhesion |
| Example 8 | 63.3 | Unbroken | Slight adhesion | Slight adhesion |
| Example 9 | 64 | Unbroken | No adhesion | Slight adhesion |
| Example 10 | 61.5 | Unbroken | Slight adhesion | Obvious adhesion |
| Example 11 | 62.6 | Unbroken | Slight adhesion | Slight adhesion |
| Example 12 | 62.3 | Unbroken | Slight adhesion | Slight adhesion |
| Example 13 | 62.6 | Unbroken | Slight adhesion | Obvious adhesion |
| Example 14 | 63.6 | Unbroken | No adhesion | No adhesion |
| Example 15 | 65.3 | Unbroken | No adhesion | No adhesion |
| Example 16 | 63.9 | Unbroken | No adhesion | No adhesion |
| Example 17 | 65.8 | Unbroken | No adhesion | No adhesion |
| Example 18 | 65.5 | Unbroken | No adhesion | No adhesion |
| Example 19 | 65.7 | Unbroken | No adhesion | No adhesion |
| Example 20 | 65.8 | Unbroken | No adhesion | No adhesion |
| Comparative example 1 | 24 | Unbroken | No adhesion | No adhesion |
| Comparative example 2 | 64.3 | Broken | Obvious adhesion | Obvious adhesion |
| Comparative example 3 | 61.7 | Broken | Slight adhesion | Obvious adhesion |
| Comparative example 4 | 56.6 | Unbroken | No adhesion | No adhesion |
| Comparative example 5 | 60.9 | Broken | Obvious adhesion | Obvious adhesion |

TABLE 5

| | Decontamination ratio | | |
| --- | --- | --- | --- |
| | JB-01 dirty cloth | JB-02 dirty cloth | JB-03 dirtycloth |
| Example 1 | 1.10 | 3.75 | 1.45 |
| Example 2 | 1.21 | 4.02 | 1.50 |
| Example 3 | 1.12 | 3.78 | 1.45 |
| Example 4 | 1.15 | 3.78 | 1.48 |
| Example 5 | 1.14 | 4.03 | 1.47 |
| Example 6 | 1.18 | 4.12 | 1.51 |
| Example 7 | 1.20 | 4.15 | 1.53 |
| Example 8 | 1.23 | 4.22 | 1.54 |
| Example 9 | 1.04 | 3.72 | 1.43 |
| Example 10 | 1.14 | 4.00 | 1.45 |
| Example 11 | 1.11 | 3.88 | 1.42 |
| Example 12 | 1.17 | 4.00 | 1.47 |
| Example 13 | 1.15 | 3.90 | 1.46 |
| Example 14 | 1.20 | 4.05 | 1.55 |

TABLE 5-continued

| | Decontamination ratio | | |
|---|---|---|---|
| | JB-01 dirty cloth | JB-02 dirty cloth | JB-03 dirtycloth |
| Example 15 | 1.24 | 4.17 | 1.56 |
| Example 16 | 1.27 | 4.29 | 1.59 |
| Example 17 | 1.34 | 4.68 | 1.71 |
| Example 18 | 1.37 | 4.71 | 1.73 |
| Example 19 | 1.36 | 4.71 | 1.71 |
| Example 20 | 1.37 | 4.74 | 1.74 |
| Comparative example 1 | 0.93 | 3.24 | 1.13 |
| Comparative example 2 | 1.05 | 3.75 | 1.46 |
| Comparative example 3 | 1.02 | 3.30 | 1.19 |
| Comparative example 4 | 0.98 | 3.30 | 1.15 |
| Comparative example 5 | 1.07 | 3.75 | 1.44 |

From Table 4 and Table 5, in Comparative example 1, a large amount of polyvinyl alcohol was used as the film-forming material without adding plant starch. It can be seen from the test results that the biodegradation rate of the detergent tablet is only 41%, which is much lower than the standard requirement of 60%, and it is difficult to meet the requirements of environmental protection. In Comparative example 2, a small amount of polyvinyl alcohol was used as the film-forming material and plant starch was added. It can be seen from the test results that the biodegradation rate of the detergent tablet reaches the standard, but the overall stability of the detergent tablet is low and the practicability is affected. In Example 6, an appropriate amount of polyvinyl alcohol was mixed with plant starch. It can be seen from the test results that not only the biodegradation rate of the detergent tablet exceeds 60%, but also the overall stability is better and the detergency is improved. In addition, by adjusting the proportion of the raw materials of the detergent tablet within the range of Examples 1 to 7, detergent tablets with good comprehensive performance are still obtained.

Compared with Comparative examples 3 to 4, in Example 6, polyvinyl alcohol with appropriate polymerization degree and molecular weight was selected, the biodegradation rate and overall stability of the detergent tablet are balanced better. In addition, it was also found that when the polymerization degree and molecular weight of polyvinyl alcohol is too large, the dissolution rate of the detergent tablet is low, and there is residue after washing. Compared with Comparative example 5, in Example 6, the addition of maltodextrin as a film-forming agent significantly improved the overall stability of the detergent tablet.

Compared with Example 5, in Example 6 and Example 7, the weight ratio of the polyvinyl alcohol to the plant starch was controlled as 1:(1.5-3), so that the detergent tablet had better detergency and moisture resistance stability.

Compared with Examples 8 to 13, in Examples 6 and 14, the plant starch was combination of pea starch and corn starch, so that the detergent tablet had better overall stability; the detergency and stability were well balanced; and the use effect of the detergent tablet was better.

Compared with Example 6, in Example 15, rhamnolipid and sophorolipid were added, and the biodegradation rate and detergency of the detergent tablet were both improved; in examples 16 to 20, the composition and proportion of the surfactant were adjusted; it was found that the detergency of the detergent tablet could be well improved and the biodegradation rate could be further improved by the combination of coco-sulfate and fatty acid methyl ester ethoxy sodium sulfonate, the combination of modified oil ethoxylate and fatty alcohol polyoxyethylene ether, and the combination of rhamnolipid and sophorolipid.

Example 1 of the present application also discloses a tableting equipment for an environmental friendly detergent tablet.

As shown in FIG. 1, an tableting equipment for the environmental friendly detergent tablet includes a frame, a molding device 1, a coating device 8, an advancing device 2, an adjusting device 3, a slicing device 4, and an discharging device 5. The frame is configured to support and install the above devices. Specifically, the frame includes a first frame 7, a second frame 71, a third frame 72, and a fourth frame 73. The molding device 1 and the coating device 8 are installed on the first frame 7; the advancing device 2 and the adjusting device 3 are installed on the second frame 71; the slicing device 4 is installed on the third frame 72; and the discharging device 5 is installed on the fourth frame 73. The mixed materials passes through the molding device 1, the coating device 8, the advancing device 2, the adjusting device 3, the slicing device 4, and the discharging device 5 in sequence to obtain the finished product of the tablet.

Figure 2:
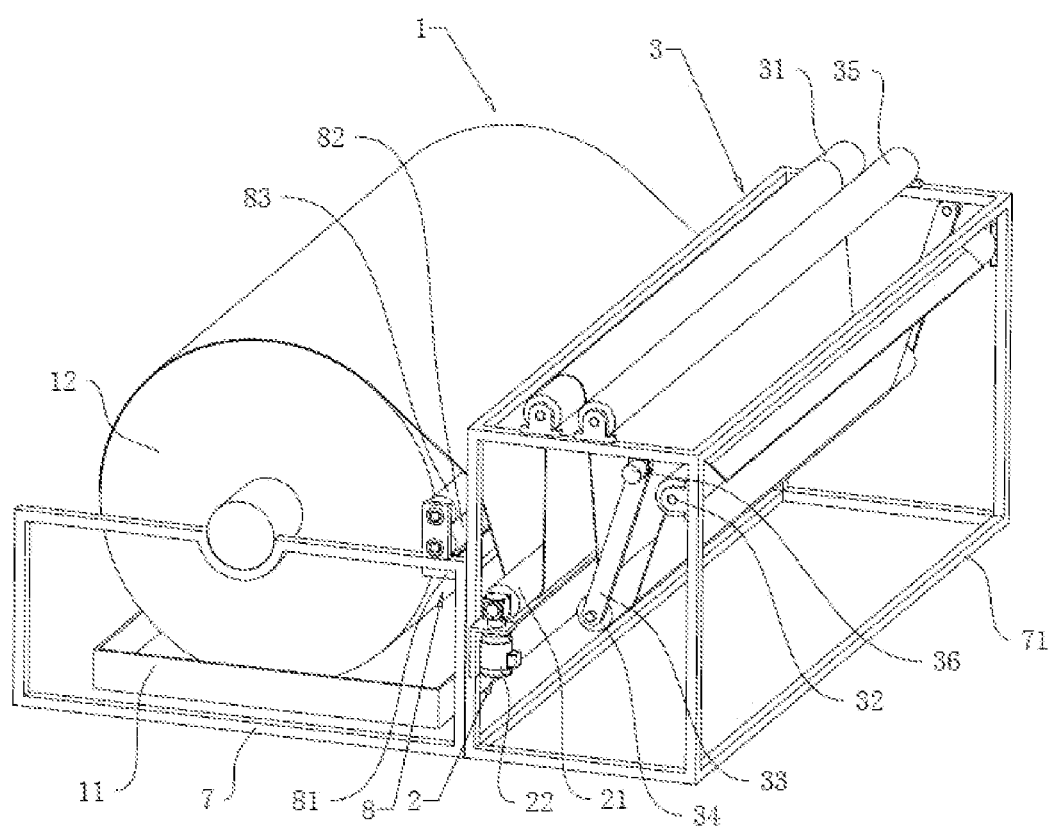
FIG. 2 is a tri-dimensional structural diagram of the molding device, the advancing device and the adjusting device according to Example 1 of the present application.

As shown in FIG. 2, the molding device 1 includes a trough 11, a drying-forming roller 12, a feeding roller and a forming driver. The trough 11 is arranged in the first frame 7. The trough 11 is configured to accommodate the mixed materials. The feeding roller is rotatably installed on the trough 11, and the surface of the feeding roller is in contact with the mixed materials. The drying-forming roller 12 is rotatably installed to the first frame 7, and the drying-forming roller 12 is arranged above the trough 11. The drying-forming roller 12 and the feeding roller are coaxially arranged with a gap between them. A heating device is provided inside the drying-forming roller 12, or a heating device is connected outside the drying-forming roller 12. The heating device may be a device with heating function such as a heating rod or a steam heater, so that the surface of the drying-forming roller 12 has a certain temperature.

The forming driver is fixedly installed on the first frame 7. The forming driver is in transmission connection with the drying-forming roller 12 and the feeding roller, and the forming driver is configured to drive the drying-forming roller 12 and the feeding roller to rotate.

In this example, the forming driver is a combination of motor and gearbox. During the rotation of the feeding roller, the mixed materials is driven to leave the trough 11 continuously. Meanwhile, the feeding roller drives the mixed materials to be coated on the surface of the drying-forming roller 12. The heat on the surface of the drying-forming roller 12 makes the moisture of the mixed materials evaporate, forming a solid semi-finished product.

The coating device 8 includes an enzyme formulation tank 81, a first coating roller 82, a second coating roller 83, and an coating driver. The enzyme formulation tank 81 is fixedly connected to the first frame 7. The enzyme formulation tank 81 is a square box. The enzyme formulation tank 81 contains bio-enzyme formulation. The first coating roller 82 and the second coating roller 83 are both rotatably connected to the first frame 7. The first coating roller 82 is arranged below the second coating roller 83. The first coating roller 82 is in contact with the bio-enzyme formulation; the first coating roller 82 is close to the second coating roller 83; and the second coating roller 83 is configured to coat the bio-enzyme formulation to the solid semi-finished product. The addition amount of the bio-enzyme formulation is controlled by adjusting the degree to which the first coating roller 82 enters the bio-enzyme formulation tank 81 and the distance between the first coating roller 82 and the second coating roller 83.

The coating device driver is in transmission connection with the first coating roller 82 and the second coating roller 83. In this example, the coating device driver is a combination of a motor and a gearbox. The coating device driver drives the first coating roller 82 and the second coating roller 83 to rotate, thereby driving the bio-enzyme formulation to continuously leave the enzyme formulation tank 81 and be attached to the surface of the first coating roller 82. The first coating roller 82 transfers the bio-enzyme formulation to the second coating roller 83, and the second coating roller 83 then applies the bio-enzyme formulation to the solid semi-finished product, so that the bio-enzyme formulation is attached to the detergent tablet.

The advancing device 2 includes an advancing roller 21 and an advancing driver 22. The advancing roller 21 is rotatably installed on the second frame 71; the advancing driver 22 is fixedly installed on the second frame 71; and the molding driver is in transmission connection with the advancing roller 21 and configured to drive the advancing roller 21 to rotate. In this example, the advancing driver 22 is a combination of a motor and a gearbox, and the advancing roller 21 rotates under the driving action of the advancing driving member 22. The solid semi-finished product is wound around the advancing roller 21 after leaving the drying-forming roller 12. The advancing roller 21 generates a force for the forward movement of the solid semi-finished product, so that the solid semi-finished product enters the adjusting device 3.

The adjusting device 3 includes a first guide roller 31, a second guide roller 32, an adjusting rod 33, and an adjusting roller 34. The first guide roller 31, the second guide roller 32, and the adjusting rod 33 are all rotatably installed on the second frame 71. Two adjusting rods 33 are provided. The adjusting roller 34 is rotatably installed between the two adjusting rods 33. The adjusting roller 34 is arranged between the first guide roller 31 and the second guide roller 32, and the installation height of the adjusting roller 34 is lower than the installation height of the first guide roller 31 and the second guide roller 32. The solid semi-finished product is wound around the first guide roller 31, the adjustment roller 34, and the second guide roller 32 in sequence in the conveying direction, and then enters the slicing device 4. An embossing roller 35 is rotatably installed on the second frame 71. The embossing roller 35 is parallel to the first guide roller 31. A pattern is provided on the surface of the embossing roller 35. The embossing roller 35 and the first guide roller 31 jointly extrude the solid semi-finished product, and the pattern can be printed on the surface of the solid semi-finished product.

Specifically, the installation height of the second guide roller 32 is lower than the installation height of the first guide roller 31. Additionally, the adjustment roller 34 can rotate freely relative to the adjusting rod 33, and the adjusting rod 33 can rotate freely relative to the second frame 71. Therefore, when the solid semi-finished product is tensioned, the adjusting rod 33 will deviate from the height direction and form an angle with the height direction.

In the present application, the slicing device 4 performs a cutting mode combining vertical cutting and transverse cutting on the solid semi-finished product. In particular, transverse cutting refers to cutting in the direction perpendicular to the conveying direction of the solid semi-finished product. In order to ensure that the forward conveying of the solid semi-finished product will not affect the transverse cutting, the solid semi-finished product of the present application advances intermittently in the slicing device 4, and the transverse cutting is performed only when the solid semi-finished product stops advancing.

Figure 3:
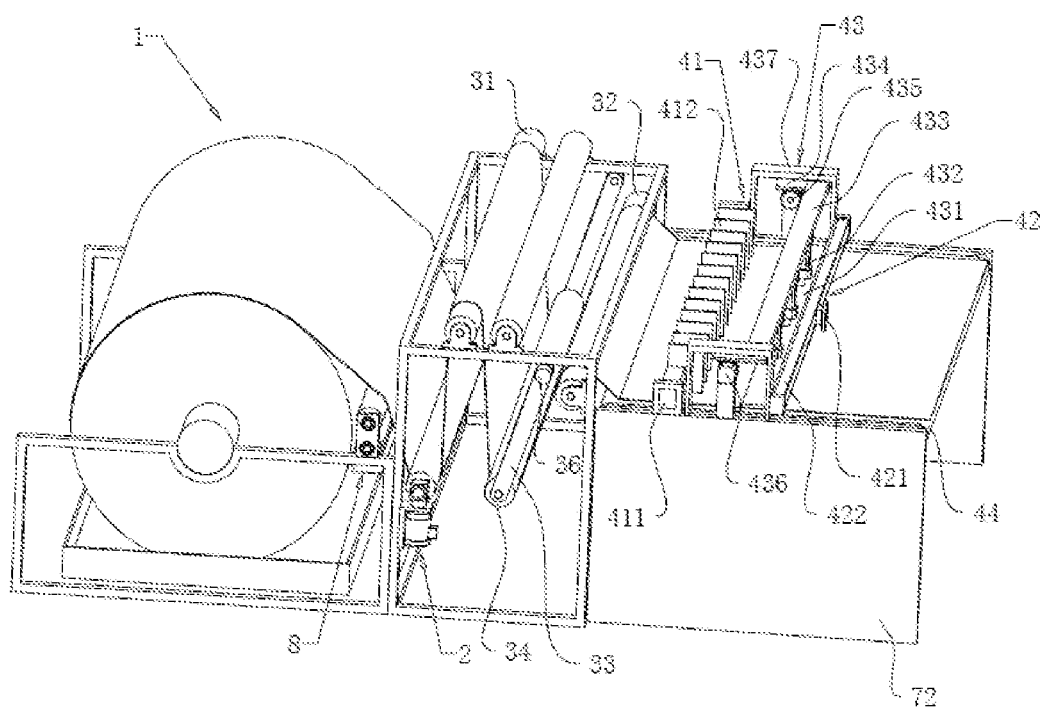
FIG. 3 is a tri-dimensional structural diagram of the molding device, the advancing device, the adjusting device and the slicing device according to Example 1 of the present application.

As shown in FIG. 2 and FIG. 3, in order to realize the above cutting mode, the second frame 71 is provided with an angle sensor 36. The angle sensor 36 may obtain the rotation angle of the adjusting rod 33. The angle sensor 36 is connected in communication with a controller. In particular, the controller is a PLC controller, which can control the operation of the tableting equipment, including the operation of the slicing device 4.

With the continuous advancing of the solid semi-finished product passing through the advancing device 2, there are more solid semi-finished product in the adjusting device 3; the tension force applied by the winding of the solid semi-finished product to the adjusting roller 34 is reduced, and the adjusting rod 33 swings downward under its gravity. When the adjusting rod 33 swings to a predetermined angle, the angle sensor 36 is triggered, and the slicing device 4 is controlled by the controller to operate, driving the solid semi-finished product to be transported to the slicing device 4. At this time, there are fewer solid semi-finished product in the adjusting device 3, the tension force applied by the winding of the solid semi-finished product to of the adjusting roller 34 is increased, the regulating roller 34 is tensioned and the regulating rod 33 swings upward; the regulating rod 33 returns to a predetermined angle; and the angle sensor 36 is triggered again to stop the operation of the slicing device 4, to control the conveying state of the solid semi-finished product, so as to realize the intermittent advance of the solid semi-finished product, and facilitate the transverse cutting of the solid semi-finished product.

The slicing device 4 includes a transverse cutting mechanism 42, a vertical cutting mechanism 41, a feeding conveyor belt 44 and a downward pressing and feeding mechanism 43. The feeding conveyor belt 44 is rotatably installed on the third frame 72. The feeding conveyor belt 44 does not have an external driving source, that is, the feeding conveyor belt 44 cannot rotate itself and the feeding conveyor belt 44 is configured to support the solid semi-finished product.

The downward pressing and feeding mechanism 43 is configured to realize the intermittent advance of the solid semi-finished product. The downward pressing and feeding mechanism 43 includes a pressing plate 431, a lifting assembly and a translation assembly. The lifting assembly is configured to drive the pressing plate 431 to be close to or away from the solid semi-finished product in the height direction, and the translation assembly is configured to drive the pressing plate 431 to move forward or backward in the conveying direction of the solid semi-finished product.

In this example, the lifting assembly includes a lifting cylinder 432. An output end of the lifting cylinder 432 moves in the height direction, and the output end of the lifting cylinder 432 is fixedly connected to the pressing plate 431. When the lifting cylinder 432 operates, the pressing plate 431 is pressed down, then the solid semi-finished product is pressed between the feeding conveyor belt 44 and the pressing plate 431, so that the feeding conveyor belt 44 and the pressing plate 431 are relatively stationary. In other examples, the lifting assembly may also be an motor-driven push-rod, a gear 435 and rack 434 transmission structure, and a leading screw and slide block transmission structure.

In this example, the translation assembly includes a mounting plate 433, a rack 434, a gear 435 and a translation motor 436. The third frame 72 is fixedly arranged with a limit base 437. The rack 434 is slidably connected to the limit base 437. The sliding direction of the rack 434 is parallel to the conveying direction of the feeding conveyor belt 44. The translation motor 436 is installed on the third frame 72. In particular, the motor is a servo motor. The gear 435 is installed on the output shaft of the translation motor 436. The gear 435 meshes with the rack 434. The rack 434, the gear 435 and the translation motor 436 are symmetrically arranged on both sides of the third frame 72. Both ends of the mounting plate 433 are fixedly connected to the two racks 434, respectively, and the lifting cylinder 432 is installed on the mounting plate 433. When the translation motor 436 operates, the gear 435 cooperates with the rack 434 to drive the mounting plate 433 to translate and drive the pressing plate 431 to translate, and cooperates with the feeding conveyor belt 44 and the pressing plate 431 to press the solid semi-finished product, so that the feeding conveyor belt 44 rotates and drives the solid semi-finished product to be conveyed forward. In other examples, the translation assembly may also be a cylinder, an motor-driven push-rod and a leading screw and slide block transmission structure. For example, a translation cylinder is provided on the third frame 72, the output end of the translation cylinder moves in the conveying direction of the solid semi-finished product, and the output end of the translation cylinder is connected to the mounting plate 433.

Under the cooperation of the lifting assembly and the translation assembly, the pressing plate 431 drives the solid semi-finished product to move forward for a certain distance, and then the pressing plate 431 rises and is translated to the original position under the action of the lifting assembly and the translation assembly, so as to carry out the next pressing and feeding. The controller is connected in communication with the lifting cylinder 432 and the translation motor 436. The lifting cylinder 432 and the translation motor 436 are started or stopped or change the output direction according to the signal of the angle sensor 36, to realize the intermittent advance of the solid semi-finished product.

The vertical cutting mechanism 41 is arranged on a side of the downward pressing and feeding mechanism 43 close to the adjusting device 3. The vertical cutting mechanism 41 includes a fixed base 411 and a vertical cutting blade 412. Both ends of the fixed base 411 are fixedly connected to both sides of the third frame 72, respectively. A plurality of vertical cutting blades 412 are provided. The vertical cutting blades 412 are fixed to the fixed base 411 at intervals in the direction perpendicular to the conveying direction of the solid semi-finished product. The solid semi-finished product are in contact with the vertical cutting blade 412 when being conveyed. The interaction between the vertical blades 412 and the solid semi-finished product realizes the vertical cutting of the solid semi-finished product.

The transverse cutting mechanism 42 is arranged on a side of the downward pressing and feeding mechanism 43 away from the adjusting device 3. The transverse cutting mechanism 42 includes a cutting saw 421 and a moving component. The cutting saw 421 can rotate and cut solid semi-finished product during the rotation. The moving component is configured to drive the cutting saw 421 to move in a direction perpendicular to the conveying direction of the solid semi-finished product, to realize the transverse cutting of the solid semi-finished product, and make the solid semi-finished product into a square finished product after vertical cutting. In this example, the moving component is a linear module 422. In other examples, the moving component may also be a rodless cylinder.

Figure 4:
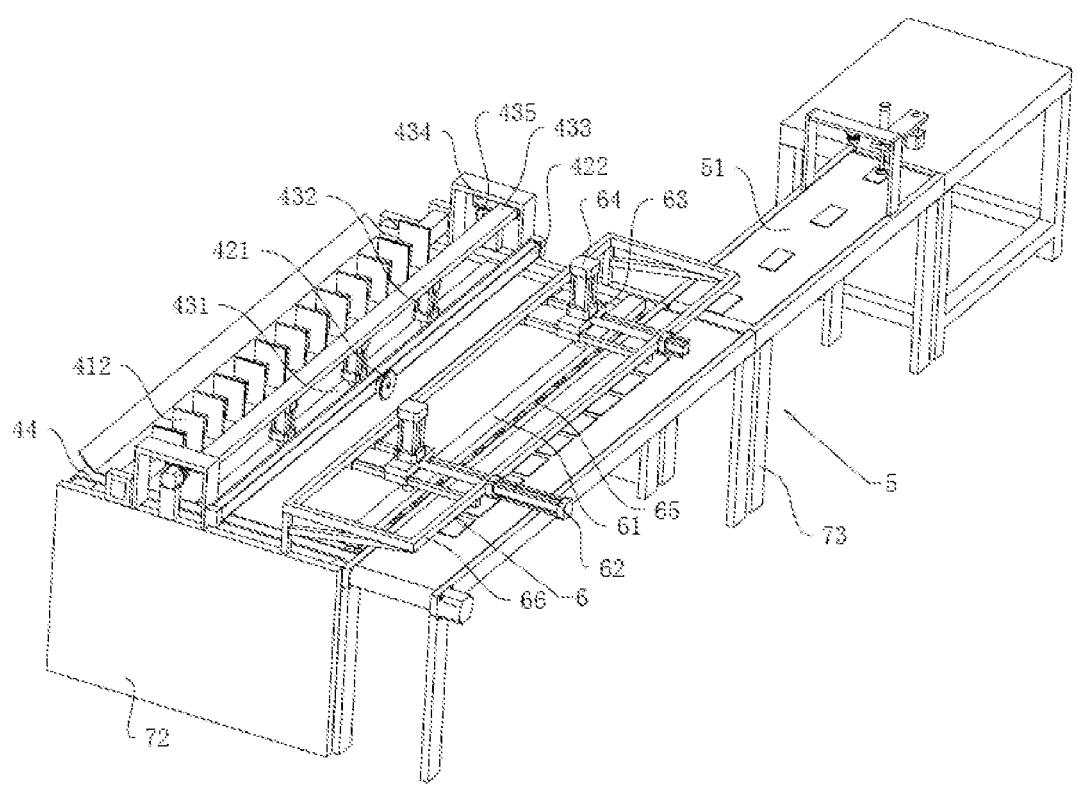
FIG. 4 is a tri-dimensional structural diagram of a slicing device and an discharging device according to Example 1 of the present application.

As shown in FIG. 4, a transfer mechanism 6 is provided between the slicing device 4 and the discharging device 5. The transfer mechanism 6 includes a transfer plate 61, a first transfer cylinder 62, a transfer base 63, and a second transfer cylinder 64. A positioning base 66 is fixedly installed on the fourth frame 73. The positioning base 66 is provided with a sliding rail for sliding connection of the transfer base 63. The first transfer cylinder 62 is installed on the positioning base 66, and the output end of the first transfer cylinder 62 is connected to the transfer base 63. The output end of the first transfer cylinder 62 moves in the conveying direction of the solid semi-finished product; the second transfer cylinder 64 is fixedly installed to the transfer seat 63; the output end of the second transfer cylinder 64 is connected to the transfer plate 61; and the output end of the second transfer cylinder 64 moves in the height direction. The output directions of the first transfer cylinder 62 and the second transfer cylinder 64 are perpendicular to each other. The transfer plate 61 is provided with a transfer sucker 65, in particular, the transfer sucker 65 is a vacuum sucker. The transfer sucker 65 is activated to suck up the finished product. The first transfer cylinder 62 and the second transfer cylinder 64 drive the finished product to leave the slicing device 4 and enter the discharging device 5.

The discharging device 5 includes a discharging conveyor belt 51, an incoming material detection photoelectric switch 52, a visual detector 53 and a sorting mechanism 54. The discharging conveyor belt 51 is provided with an external drive source, and the discharging conveyor belt 51 can rotate. The discharging conveyor belt 51 supports the finished products and conveys them. The incoming material detection photoelectric switch 52 and the visual detector 53 are both arranged at one end of the discharging conveyor belt 51 and connected in communication. The incoming material detection photoelectric switch 52 is connected in communication with the visual detector 53. When the finished product is transported to a position where the incoming material detection photoelectric switch 52 may be triggered, the visual detector 53 takes pictures of the finished product and detects whether the finished product is good or defective.

Figure 5:
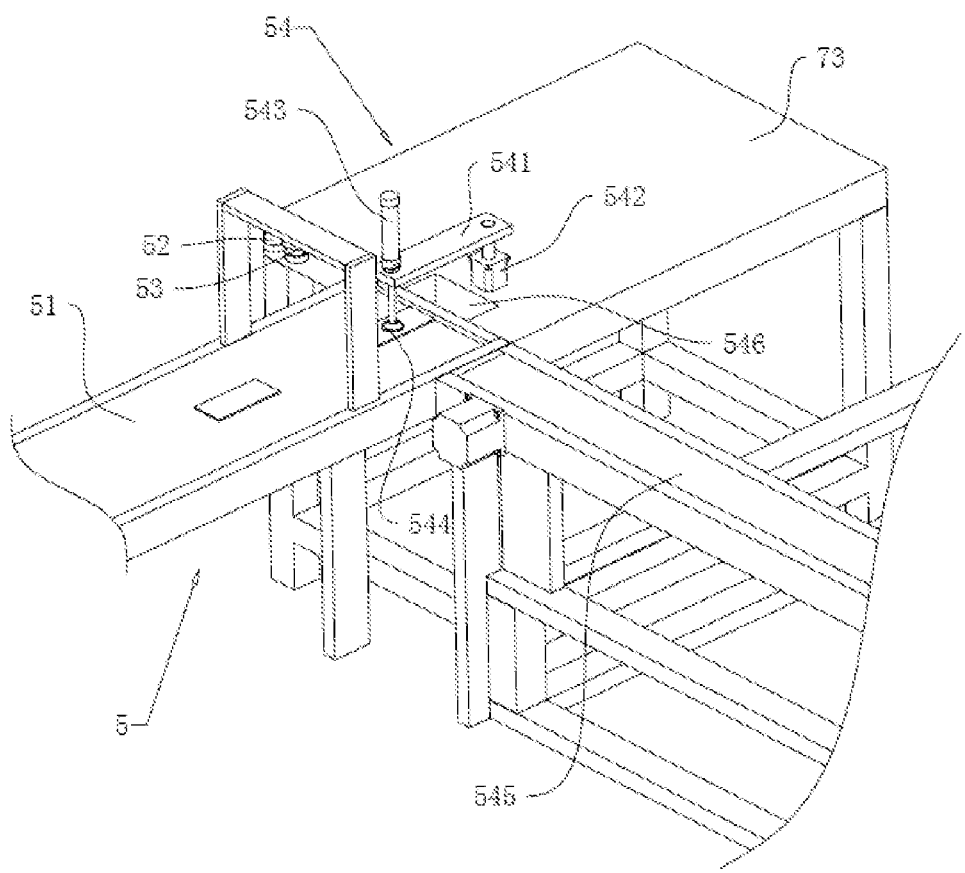
FIG. 5 is a tri-dimensional structural diagram of an discharging device according to Example 1 of the present application.

As shown in FIG. 5, the sorting mechanism 54 includes a sorting plate 541, a sorting motor 542, a sorting cylinder 543, a sorting sucker 544, and a good product conveyor belt 545. The fourth frame 73 is provided with a defective product placement port 546 for dropping of the defective products. In particular, the sorting motor 542 is a servo motor. The sorting driver is installed on the fourth frame 73. The sorting plate 541 is connected to the output shaft of the sorting motor 542. The sorting cylinder 543 is installed on the sorting plate 541. The sorting sucker 544 is installed at the output end of the sorting cylinder 543. In particular, the sorting sucker 544 is a vacuum sucker. The sorting motor 542, the sorting cylinder 543, and the sorting sucker 544 are all connected in communication with the visual detector 531. The visual detector 53 is connected in communication with the controller. The good product conveyor belt 545 is arranged close to the end of the discharging conveyor belt 51 and has a conveying direction perpendicular to the conveying direction of the discharging conveyor belt 51. When a defective product is detected, the defective product continues to be transported forward and falls into the defective product placement port 546. When a good product is detected, the sorting motor 542, the sorting cylinder 543 and the sorting sucker 544 are started; the sorting cylinder 543 drives the sorting plate 541 to descend; the sorting sucker 544 sucks the good product; then the sorting cylinder 543 drives the sorting plate 541 to rise; the sorting motor 542 drives the sorting plate 541 to rotate, so that the good product leaves the discharging conveyor belt 51 and enters above the good product conveyor belt 545; then the good product is put down; and the good product conveyor belt 545 supports the good product and conveys the good product to the next process.

Implementation principle of the tableting equipment:

The molding device 1 dries the mixed materials into solid semi-finished product; the advancing device 2 generates a force for moving the solid semi-finished product; and then the transverse cutting mechanism 42 and the vertical cutting mechanism 41 cut the solid semi-finished product into finished products. The regulating device 3 and the downward pressing and feeding mechanism 43 realize the intermittent advance of the solid semi-finished product to complete the tableting.

What is claimed is:

1. A detergent tablet made of the following raw materials by weight percentage:
4%-17% of polyvinyl alcohol,
1-5% of dextrin,
10%-20% of pea starch,
10%-20% of corn starch,
0.05%-0.5% of protease,
0.05%-0.5% of cellulase,
0-0.3% of amylase,
0-0.3% of pectinase,
0.5%-3% of sodium citrate,
0.1-2% of citric acid,
0-2% of tetrasodium glutamate acid diacetate,
3.2%-6% of glycerol,
3.2%-6% of propylene glycol,
0-1% of butanediol,
24.5-36% of sodium coco-sulfate,
0-3.6% of modified oil ethoxylate,
1.5%-3.6% of fatty alcohol polyoxyethylene ether,
4.5%-8.1% of fatty acid methyl ester ethoxy sulfonate,
1.5-2% of alkyl polyglycoside,
1.1%-2.2% of sophorolipid, and
2.2%-3.4% of rhamnolipid.

2. The detergent tablet according to claim 1, wherein, the pea starch has a whiteness value of 89%-92.5% and a moisture content of 7%-9.3%; and the corn starch has a whiteness value of 86%-90% and a moisture content of 9%-10.5%.

3. A preparation method for the detergent tablet according to claim 1, comprising the following steps:
mixing water, the polyvinyl alcohol and the dextrin film forming agent under stirring, heating to 80° C-90° C, and continuing stirring to obtain an initial mixed slurry;
adding the glycerol, the propylene glycol, and the butanediol into the initial mixed slurry under stirring, then adding the sodium coco-sulfate, the modified oil ethoxylate, the fatty alcohol polyoxyethylene ether, the fatty acid methyl ester ethoxy sulfonate, the alkyl polyglycoside, the sophorolipid, and the rhamnolipid- under stirring, then adding the pea starch and the corn starch under stirring to obtain a mixed material; and
drying the mixed material, coating with the protease, the cellulase, the amylase, and the pectinase, molding, and slicing to obtain the detergent tablet.

* * * * *